(12) United States Patent
Nolan

(10) Patent No.: US 7,240,599 B2
(45) Date of Patent: Jul. 10, 2007

(54) ELECTRIC ROPE

(76) Inventor: Bruce Nolan, 186 Beckwith Boundary Road, Aston, Ontario (CA) K0A 1B0

( * ) Notice: Subject to any disclaimer, the term of this patent is extended or adjusted under 35 U.S.C. 154(b) by 68 days.

(21) Appl. No.: 10/963,553

(22) Filed: Oct. 14, 2004

(65) Prior Publication Data

US 2005/0082083 A1    Apr. 21, 2005

Related U.S. Application Data

(60) Provisional application No. 60/511,109, filed on Oct. 15, 2003.

(51) Int. Cl.
*D04C 1/06*    (2006.01)
(52) U.S. Cl. ............................................. 87/8; 57/210
(58) Field of Classification Search ................. 87/8–13
See application file for complete search history.

(56) References Cited

U.S. PATENT DOCUMENTS 3,805,667 A *    4/1974    Orser ............................. 87/6
6,341,550 B1 *    1/2002    White ............................. 87/5
6,727,197 B1 *    4/2004    Wilson et al. ............... 442/301

* cited by examiner

*Primary Examiner*—Shaun R. Hurley
(74) *Attorney, Agent, or Firm*—Jones, Tullar & Cooper, P.C.

(57) ABSTRACT

This invention teaches a rope that can be electrified. The rope is comprised of an outer sheath and an inner core. The outer sheath includes non-conductive elements braided with one or more conductive elements. The conductive elements are wound in a parallel helical pattern and do not touch each other. The inner core is a braid comprising non-conductive and conductive elements. In both cores, the conductive elements comprise one or more metal strands and the non-conductive elements comprise one or more monofilaments of synthetic or natural fibers. Should a breakage occur in the conductive elements of the outer sheath, the conductive elements of the inner core provide conductivity across the breakage and throughout the length of the rope by intermittently contacting the conductive elements of the outer sheath. An optional colored tracer can be braided into the outer sheath to provide better visibility since the non-conductive elements are preferably a neutral color, such as white.

17 Claims, 1 Drawing Sheet

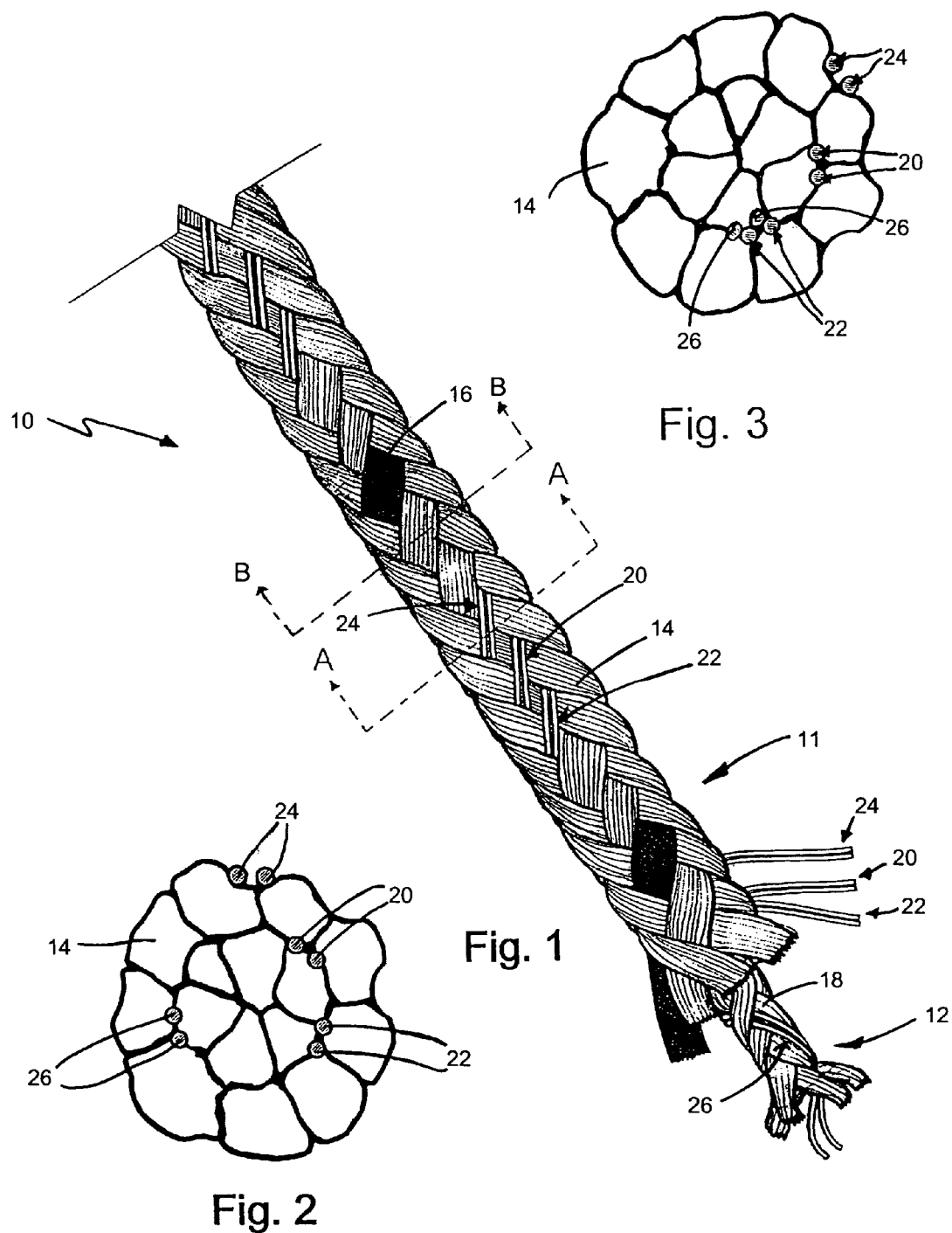

ELECTRIC ROPE

This application claims the benefit of U.S. Provisional Application No. 60/511,109 filed Oct. 15, 2003.

BACKGROUND OF THE INVENTION

1. Field of the Invention

This invention relates to a rope that provides electrical conductivity. In particular, the rope can be used as an electric fence to contain animals within an area or deter animals from entering an area.

2. Background Information

Several devices exist for the containment of animals. Permanent fences made of wood or metal are resilient, but require an expensive and complicated installation. Often a situation will necessitate a non-permanent fence, such as for restricting horses to graze in a portion of a field. Electric fences can be a non-permanent barrier or a long-term solution for cordoning off an area and providing an effective deterrent to contain livestock or exclude wildlife.

Several criterion exist for the durability and characteristics of a good electric fence. Such a fence should withstand the weather, including snow, rain, hail, winds and sleet, especially as encountered in a Northern climate. The fence should also be UV resistant. If an animal brushes the fence, an immediate shock should be administered. Additionally, the fence should be supple and resilient in the event of a collision by an animal. Ideally, the fence should last for several years to avoid the hassle of constant replacement or repair. The ability to meet all of the above criteria is challenging for a fence typically constructed of weather-sensitive metal and pliable, degradable synthetic fibres.

Traditional electric fences combine metal and synthetic fibres to create a rope or a tape. Often, the metal wire becomes broken, either due to the collision of an animal with the fence or under deterioration caused by harsh climate conditions. Upon breakage, the entire fence loses effectiveness as the electrical circuit is interrupted. A tradeoff must be made between the strength of the metal and the conductivity of the metal. For example, copper has high conductivity, but is low in strength, prone to breakage and degrades quickly when exposed to outdoor climate conditions. Additionally, the use of inexpensive, substandard polyester will usually cause deterioration of the fence within 24 months, which is a relatively short timeframe to require replacement of the fence. Related to the type of metal and synthetic fibres used, the thickness of the fence must also be balanced with the weight of the fence since a thicker fence will withstand collision better, but will be heavy and may have installation issues.

U.S. Pat. No. 4,861,645 teaches a fencing tape with electrically conducting wires. The flat electrifiable fence has at least two conductive wires running through the length of the tape with bridges between the wires to provide conductivity in the event of a wire breakage. In the preferred embodiment, the tape is made of polyolefin and the wires are stainless steel.

U.S. Pat. No. 5,036,166 teaches an electrical fence line that can be a tape or a rope. The non-conductive material is of high strength and high visibility and is either woven, braided or twisted with the conductive material. The conductive material consists of two wires, one highly electric with low strength, such as copper, and the other of high strength, incurring a higher resistance, such as stainless steel. The wires touch either continuously or intermittently along the length of the fence.

U.S. Pat. No. 6,341,550 teaches an electric fence with a braided exterior layer that is constructed of several conductive and non-conductive elements, each comprised of individual twisted strands. An optional inner core of non-conductive elements exists to create a rope made of mainly non-conductive elements. The conductive elements consist of one or more conductive strands combined with non-conductive strands. The conductive elements can alternatively contain solely conductive strands. A rope comprising two conductive elements is the preferred embodiment with the first conductive element braided in a counter-clockwise helix and the second conductive element braided in a clockwise helix. Half of the remaining non-conductive elements are wound clockwise, the other half, counter-clockwise. The tightness of the helix is variable depending on the amount of give required in the rope—tighter coils allow more give in the rope. The purpose of the double helix is to protect the low strength conductors from tensional strain since the helical structure allows the copper to uncoil as the rope is stretched until the outer fibres clamp down on the inner core.

SUMMARY OF THE INVENTION

It is an object of the present invention to provide a novel electric rope.

One aspect of the present invention relates to an electric rope designed to be strong, flexible and resilient to UV degradation and weathering caused by harsh climate conditions. The electric rope is lightweight and able to withstand the effects of damaged or broken conductive sections. An inner core and an outer sheath each comprise conductive elements braided with non-conductive elements. A tracer constructed of coloured non-conductive strands can be provided for visibility, the colour of which is chosen to contrast with the colour of the non-conductive elements in the outer sheath. Preferably the colour of the tracer is teal, which has been shown to be more UV resilient than other colours.

The braiding allows conductive elements of the outer sheath to periodically contact conductive elements of the inner core. The conductive elements in the outer sheath are intermittently exposed both on the surface of the sheath and on the interior of the sheath. When the outer sheath conductive elements are on the interior of the sheath, contact can occur with the conductive elements of the inner core, thereby maintaining or restoring conductivity in the outer sheath. In this manner, the conductive elements of the inner core provide conductivity throughout the length of the rope to overcome the effects of a breakage in the conductive elements of the outer sheath. The outer sheath serves to protect the inner core from the climate and to apply a shock to an animal upon contact.

In another aspect of the present invention, an electric rope comprises an outer sheath and an inner core, wherein the outer sheath comprises a plurality of non-conductive elements braided with two or more conductive elements. Each conductive element is wound in a separate helical pattern throughout the length of the rope, thereby remaining isolated from other conductive elements in the outer sheath. The inner core comprises a plurality of non-conductive elements braided with at least one conductive element, such that the conductive element can be wound in a helical pattern throughout the length of the rope. The conductors in the inner core maintain conductivity in the event of a breakage in the conductive elements of the outer sheath.

A further aspect of the present invention teaches an electric rope comprising a plurality of non-conductive elements braided with at least one conductive element, wherein the conductive element is wound in a helical direction throughout the length of the rope. If two or more conductive elements are included, all the conductive elements are wound either clockwise or counterclockwise throughout the length of the rope, and each conductive element is wound with the same pitch, but longitudinally displaced from one another, thereby allowing the conductive elements to remain separate throughout the length of the rope.

Another aspect of the present invention teaches an electric rope comprising an inner core surrounded by an outer sheath. Bridging means exists to enable conductivity between the inner core and the outer sheath at intermittent intervals. The conductivity imparts electricity to the outer sheath at the intermittent intervals, while the bridging means circumvents any conductivity breakages in the outer sheath by enabling conductivity at the intermittent intervals that occur before and after the breakage.

BRIEF DESCRIPTION OF THE DRAWINGS

FIG. 1 shows a cutaway section of the electric rope according to the invention.
FIG. 2 is a cross sectional view along A—A of FIG. 1.
FIG. 3 is a cross sectional view along B—B of FIG. 1.

DESCRIPTION OF THE PREFERRED EMBODIMENT

The present invention is an animal containment and deterrent in the form of an electrically conductive rope for an electric fence. As shown in FIG. 1, the rope 10 comprises a braided outer sheath 11 and a braided inner core 12, each comprising a combination of non-conductive elements 14, 16 and 18, and conductive elements 20, 22, 24 and 26. The braid allows the sheath conductive elements 20, 22 and 24 to be exposed intermittently on the exterior and interior surfaces of the outer sheath 11. Accordingly, the core conductive elements 26 periodically contact the sheath conductive elements 20, 22 and 24 appearing on the interior surface of the outer sheath. In this manner, the electric rope is able to withstand the effects of broken conductive sections in the outer sheath 11 since the conductive elements 26 of the inner core 12 bridge contacts throughout the rope. The outer sheath 11 serves to protect the conductive elements 26 of the inner core 12 from degradation due to weathering, which prolongs the lifetime of the rope 10. Additionally, the conductive elements 20, 22 and 24 on the surface of the outer sheath 11 provide a shock to an animal upon contact.

The outer sheath 11 comprises one or more conductive elements, each element including at least one electrically conductive wire. In the preferred embodiment, three conductive elements 20, 22 and 24 are braided in a parallel helical orientation throughout the length of the outer sheath 11. In such an orientation, the conductive elements are all wound either clockwise or counter-clockwise and do not touch each other. A tracer element 16 comprising non-conductive coloured fibres can be optionally braided throughout the length of the outer sheath 11. Two or more tracer elements can be included in the braid, wound in opposing or non-opposing orientations. In an opposing orientation, one tracer element is braided in a clockwise pattern, while the other tracer element is braided in a counter-clockwise pattern.

The braid of the inner core 12 comprises a plurality of non-conductive elements 18 and conductive elements 26, with a minimum of one conductive element. Each conductive element 26 comprises one or more metal strands. The conductive elements 26 of the inner core 12 are wound in a parallel helical configuration, opposing the direction of the sheath conductive elements 20, 22 and 24, with a differing or same pitch, thereby allowing periodic electrical contact between the inner core 12 and the outer sheath 11 along the length of the rope. Alternatively, the core conductive elements 26 can be wound in the same direction as the sheath conductive elements 20, 22 and 24, provided the pitch differs. The inner core 12 could also be twisted or straight instead of braided. In the embodiment shown in FIG. 1, the conductive elements 20, 22 and 24 of the outer sheath 11 and the conductive elements 26 of the inner core 12 are wound with differing pitch in opposing directions.

FIG. 2 shows a cross-sectional view of the rope through section A—A of FIG. 1. Conductive element 24 is on the exterior surface of the outer sheath 11 while the two remaining conductive elements 20 and 22 of the outer sheath 11 are on the interior surface. Conductive element 26 of the inner core 12 is on the surface of the inner core 12, but is not touching the conductive elements 20, 22 and 24 of the outer sheath 11 in this particular cross-sectional slice. As the braids continue, the conductive elements of the outer sheath 11 will rotate in a helical pattern and will periodically contact the conductive element of the inner core 12. FIG. 3, a cross-sectional view along B—B of FIG. 1, shows that core conductive element 26 is in contact with sheath conductive element 22.

In the preferred embodiment shown in FIG. 1, the non-conductive elements 18 of the inner core 12 consist of 100% nylon. There are six strands of nylon per non-conductive element, generating a total of 90 strands or monofilaments of nylon. One conductive element 26 comprising two separate strands of 0.012-gauge stainless steel wire is braided with the nylon elements. The inner core 12 has three picks per inch and a breaking strength of 1050 lbs. The non-conductive elements 14, 16 of the outer sheath 11 are also made of 100% nylon, with nine strands per element generating a total of 117 strands or monofilaments. Three conductive elements, 20, 22 and 24, each comprising two strands of 0.012-gauge stainless steel, are wound in a helical pattern, approximately parallel to one another throughout the length of the rope. The outer sheath 11 has seven picks per inch. The breaking strength for the complete rope is approximately 1950 lbs. Non-conductive element 16 is a teal tracer, provided for visibility against the neutral colour of the non-conductive elements 14 of the outer sheath 11.

An alternative embodiment has 10 monofilaments per non-conductive element in the braided inner core and the braided outer sheath. The synthetic fiber chosen is 840 Denier Nybrite™ neutral nylon. The outer sheath has eight non-conductive elements of neutral colour and two teal tracer elements, while the inner core has 12 non-conductive elements. There are two conductive elements in the inner core and three conductive elements in the outer sheath, with at least one 0.012-gauge stainless steel wire in each conductive element.

In a third embodiment, the braided inner core has five separate non-conductive elements, each element comprising 18 monofilaments. These five elements producing 90 monofilaments are braided to a tightness ranging from 3 to 32 picks/inch. One conductive element, containing two conductive wires, is braided in a helical orientation within the inner braid. The braided outer sheath has seven separate non-conductive elements, each element comprising 17 monofilaments. These seven elements of 119 monofilaments are braided to a tightness ranging from 7 to 32 picks/inch. Three additional conductive elements, each containing three separate conductive wires, are woven in a parallel helical orientation, either clockwise or counter-clockwise, with the non-conductive elements of the outer sheath.

Although the conductive elements can be made of any conductive metal, stainless steel is preferred, while other alloys such has copper, copper coated steel and galvanized steel are also acceptable. The non-conductive elements are extruded monofilaments or spun yarn, formed from high quality synthetic fibres, such as marine grade nylon, UV stabilized nylon, polyester, polyamide, polyethylene, polypropylene or aramid, any of which can be treated against degradation caused by UV radiation. One example of a suitable, commercially available synthetic fiber is Dupont™ Type 66 Nylon, which is treated against UV-radiation degradation.

Overall, the rope has a minimum breaking strength of 1050 lbs. More preferably, the outer sheath 11 has a breaking strength of at least 900 lbs and the inner core 12 has a breaking strength of at least 1050 lbs, giving the complete rope 10 a breaking strength of at least 1950 lbs. The rope 10 is substantially non-expandable under tension.

The manufacturing and packaging of the rope is performed with conventional processes. The rope can be packaged in rolls ranging from 200 meters to 600 meters in length. The inner core is independently manufactured from the outer sheath, after which the outer sheath is woven around the inner core. This allows for two separate braiding processes.

The foregoing has described the electric rope of the present invention. It is realized that, a skilled person in the art could deviate from the exact structure as described herein without departing from the spirit of the invention.

What is claimed is:

1. An electric rope comprising an outer sheath and an inner core,
   said outer sheath comprising a plurality of sheath non-conductive elements braided with two or more sheath conductive elements, each sheath conductive element being wound in a separate helical pattern throughout the length of the outer sheath, thereby remaining isolated from other sheath conductive elements, and
   said inner core comprising a plurality of core non-conductive elements braided with at least one core conductive element, said at least one core conductive element being wound in a helical pattern throughout the length of the inner core,
   the sheath conductive elements contacting the core conductive elements at intermittent intervals along the electric rope, thereby providing conductivity throughout the length of the electric rope and across any breakage in the sheath conductive elements.

2. The electric rope of claim 1 wherein the sheath conductive elements comprise one or more wire strands and the sheath non-conductive elements comprise one or more monofilaments.

3. The electric rope of claim 1 wherein the core conductive elements comprise one or more wire strands and the core non-conductive elements comprise one or more monofilaments.

4. The electric rope of claim 2 wherein the core conductive elements comprise one or more wire strands and the core non-conductive elements comprise one or more monofilaments.

5. The electric rope of claim 1 wherein the sheath non-conductive elements have a base colour, and at least one of the sheath non-conductive elements is a tracer element, thereby having a colour differing from said base colour.

6. The electric rope of claim 2 wherein the sheath non-conductive elements have a base colour, and at least one of the sheath non-conductive elements is a tracer element, thereby having a colour differing from said base colour.

7. The electric rope of claim 3 wherein the sheath non-conductive elements have a base colour, and at least one of the sheath non-conductive elements is a tracer element, thereby having a colour differing from said base colour.

8. An electric fence rope comprising an inner core surrounded by an outer sheath,
   said outer sheath comprising a plurality of sheath non-conductive elements braided with at least one sheath conductive element, each said at least one sheath conductive element being braided in a helical direction throughout the length of the electric fence rope so as to be exposed intermittently along the surface of the electric fence rope,
   said inner core comprising at least one core conductive element,
   said at least one sheath conductive element being in conductive contact with said at least one core conductive element at intermittent intervals along the electric fence rope, thereby providing conductivity throughout the length of the electric fence rope and across any breakage in said at least one sheath conductive element.

9. The electric fence rope of claim 8 comprising two or more sheath conductive elements, said sheath conductive elements being braided in the same helical direction throughout the length of the electric fence rope, wherein each sheath conductive element is braided with the same pitch, and displaced longitudinally, thereby allowing said sheath conductive elements to remain separate throughout the length of the electric fence rope.

10. The electric fence rope of claim 8, wherein said inner core comprises a plurality of core non-conductive elements braided with said at least one core conductive element, each said at least one core conductive element being braided in a helical direction throughout the length of the inner core.

11. The electric fence rope as claimed in claim 10, wherein the helical direction of said at least one sheath conductive element is opposite the helical direction of said at least one core conductive element.

12. The electric fence rope as claimed in claim 10, wherein said at least one sheath conductive element is braided in the same helical direction as said at least one core conductive element but with a differing pitch.

13. The electric fence rope as claimed in claim 10, comprising a plurality of core conductive elements being braided in the same helical direction throughout the length of the electric fence rope, wherein each core conductive element is braided with the same pitch, and displaced longitudinally, thereby allowing said core conductive elements to remain separate throughout the length of the electric fence rope.

14. The electric fence rope as claimed in claim 10, comprising a plurality of core conductive elements being braided in opposing helical directions throughout the length of the electric fence rope.

15. An electric rope comprising:
    an inner core surrounded by an outer sheath, and
    bridging means to enable conductivity between said inner core and said outer sheath at intermittent intervals,
    said conductivity imparting electricity to said outer sheath at said intermittent intervals, and
    said bridging means circumventing any conductivity breakages in said outer sheath by enabling conductivity at the intermittent intervals occurring before and after the breakage.

16. The electric fence rope of claim 15, wherein said outer sheath comprises at least one conductive element exposed at least intermittently along the surface of the outer sheath, and said bridging means enables conductivity between said inner core and said at least one conductive element.

17. The electric fence rope of claim 16, wherein said inner core comprises at least one conductive element.

* * * * *